United States Patent

Samejima et al.

[11] Patent Number: 5,732,540
[45] Date of Patent: Mar. 31, 1998

[54] MOWER APPARATUS

[75] Inventors: Kazuo Samejima; Mitsuhiro Matsuyama; Hideo Okura, all of Sakai, Japan

[73] Assignee: Kubota Corporation, Japan

[21] Appl. No.: 603,754

[22] Filed: Feb. 20, 1996

[30] Foreign Application Priority Data

Feb. 22, 1995 [JP] Japan .................. 7-033392

[51] Int. Cl.⁶ .................................. A01B 55/18
[52] U.S. Cl. .................. 56/320.1; 56/16.7; 56/17.5
[58] Field of Search .................. 56/16.7, 17.5, 56/13.9, 13.7, 13.8, 17.4, 255, 295, 320.1, 320.2, 502, 503, 15.1, 15.2, 15.6, 15.7

[56] References Cited

U.S. PATENT DOCUMENTS

| | | |
|---|---|---|
| 4,543,773 | 10/1985 | Reilly . |
| 4,715,168 | 12/1987 | Oxley . |
| 5,035,108 | 7/1991 | Meyer et al. ............. 56/320.2 X |
| 5,129,217 | 7/1992 | Loehr .................. 56/320.2 X |
| 5,133,176 | 7/1992 | Baumann et al. .......... 56/320.1 X |
| 5,212,938 | 5/1993 | Zenner et al. ............ 56/320.1 |
| 5,251,430 | 10/1993 | Matsumoto et al. ........ 56/320.2 X |
| 5,457,947 | 10/1995 | Samejima et al. . |
| 5,465,564 | 11/1995 | Koehn et al. ............. 56/320.2 |

*Primary Examiner*—Terry Lee Melius
*Assistant Examiner*—Robert Pezzutto
*Attorney, Agent, or Firm*—Webb Ziesenheim Bruening Logsdon Orkin & Hanson, P.C.

[57] ABSTRACT

A mower including a plurality of cutter blades is disclosed. The mower includes a housing accommodating the cutter blades. The housing includes a first a first side face defining a discharge opening for discharging grass clippings, a side panel formed at a second side face disposed on the opposite side to the first side face relative to a longitudinal center line of a vehicle body, and a front panel having a first front panel disposed on the side of said discharge opening, and a second front panel including a flat extension portion extending on the opposite side to the discharge opening. The flat extension portion extends substantially to a virtual line extending from an outer side end of a locus of revolution of the blade disposed adjacent the second side face in parallel with a traveling direction of the vehicle body.

12 Claims, 8 Drawing Sheets

MOWER APPARATUS

BACKGROUND OF THE INVENTION

1. Field of the Invention

The present invention relates to a mower apparatus including a cutter housing accommodating a plurality of cutter blades therein and defining, at a lateral side thereof, a discharge opening for discharging grass clippings cut by the cutter blades therethrough.

2. Description of the Related Art

Conventional mower apparatuses of the above-noted type are known from e.g. U.S. Pat. No. 4,715,168, U.S. Pat. No. 5,251,430, U.S. Pat. No. 5,457,947, and U.S. Pat. No. 4,543,773.

U.S. Pat. No. 4,718,168 discloses a front-mount type passenger-driven mower. The mounted mower apparatus includes a cutter housing in which a plurality of cutter blades are accommodated. On the opposite side to its discharge opening, an outer peripheral edge of this cutter housing is formed of a curvature face portion. And, judging from FIG. 4 of this reference invention, this curvature face portion has a greater radius than the radius of locus of revolution of the cutter blade. Accordingly, when the mower vehicle travels forward using the mower apparatus for cutting grass, the coming grass tends to 'escape' laterally outwards along the arc of the curvature face portion, such that such grass remains un-cut. Therefore, in the case of grass cutting operation on the opposite side to the discharge opening of the cutter housing, there is the possibility of irregular cutting or uncutting of the grass.

Like the above-described convention, U.S. Pat. No. 5,251,430 discloses a mid-mount type passenger driven mower. The mounted mower apparatus includes a cutter housing accommodating a plurality of cutter blades. This reference discloses details of relative dimensional relationship between the housing and the blades proposed for optimizing the cutting performance of the apparatus and the results of some experiments conducted in this regard. However, this apparatus does not seem to provide any advantageous effect when used for a grass cutting operation on the opposite side to the discharge opening of the housing. For, as may be apparent from FIG. 5 of this reference, a front corner 22e, in the form of an arc, is formed at a front portion of the side face of the housing opposite to the other side face defining the discharge opening. Then, if a virtual line is drawn tangentially from the left top (the outer lateral side of the vehicle body) point on the locus of revolution of the cutter blade adjacent the arc to extend forwardly in parallel with the traveling direction of the vehicle, this virtual line passes through the arc.

That is to say, with the above-described construction, there is the possibility that grass located on the right side in the drawing relative to the virtual line is felled down to the laterally outer side relative to the traveling vehicle. Moreover, the front corner 22e is present in the vicinity of the joint portion between a side panel 22b and a front panel 22a. Thus, in a grass cutting operation, grass passing through this area will be felled down twice by coming into contact with first the front panel 22a and then the front corner 22e respectively, so that it may become difficult for this grass to be resiliently raised to be cut. Further, judging again from FIG. 5, the front panel 22a has a significant inclination relative to the lateral direction of the vehicle body, so that this will increase the possibility of the grass being felled down to the laterally outwards relative to the vehicle body.

For the above reasons, the mower disclosed in this reference cannot be considered best suited for cutting an edge of the grass field.

U.S. Pat. No. 5,457,947 discloses a passenger driven mid-mount type mower including a housing accommodating a plurality of cutter blades and capable of acting also as a mulching mower. As may be apparent from FIG. 2 of this reference, the side plate of the cutter housing on the opposite side to the discharge opening is formed of a curvature face. In this construction too, like the construction of the foregoing reference discussed above, if a virtual (tangential) line is drawn from the right end (the limit of the cutting width on the side opposite to the discharge opening) of the locus of revolution of the blade disposed adjacent the discharge opening to extend in parallel with the traveling direction of the vehicle body, this virtual line crosses the curvature face portion. When observed independently, this curvature face portion has an inclination of approximately 90 degrees relative to the lateral direction of the vehicle body at the end opposite to the discharge opening, with the inclination gradually decreasing therefrom. Then, as the outer side end of the locus of revolution of the blade disposed on the opposite side to the discharge opening constitutes the limit of the cutting width in a normal grass cutting operation, for enabling effective side edge cutting operation, it is desired to minimize the possibility of grass being felled to the laterally outwards at this limit zone of the cutting width. Therefore, in this respect, the housing portion forwardly of the side top point in the locus of revolution of the cutter blade on the opposite side to the discharge opening is likely to present the possibility of felling down the glass to the laterally outwards. For this reason, just like the foregoing references, the mower of this reference too is not best suited for effectively carrying out an edge cutting operation.

The same arguments as above may apply also to the reference U.S. Pat. No. 4,543,773.

Considering the above references, for enabling an efficient edge cutting operation, there remains room for improvement in the shape of the cutter housing so as to minimize the possibility of grass being felled to the laterally outer side in the vicinity of the outer limit of the locus of revolution of the cutter blade disposed on the opposite side to the discharge opening, i.e. in the vicinity of the lateral limit of the cutting width.

SUMMARY OF THE INVENTION

In view of the above, a primary object of the present invention is to provide a passenger-driven type mower including a housing accommodating a plurality of cutter blades, which mower can effectively carry out an edge cutting operation of a grass field with minimum cost increase while maintaining cutting performance of the conventional mower.

For accomplishing the above-noted object, according to the present invention, a mower including a plurality of cutter blades, comprises:

a housing accommodating the cutter blades, the housing including, a first side face defining a discharge opening for discharging grass clippings, a side panel formed at a second side face disposed on the opposite side to the first side face relative to a longitudinal center line of a vehicle body, and a front panel having a first front panel disposed on the side of said discharge opening, and a second front panel including a flat extension portion extending on the opposite side to the discharge opening;

wherein said flat extension portion extends substantially to a virtual line extending from an outer side end of a locus of revolution of said blade disposed adjacent said second side face in parallel with a traveling direction of the vehicle body; and rotation centers of said respective cutter blades are located rearwardly of a common tangential line interconnecting forward ends of revolution loci of said cutter blade disposed adjacent said first side face and of said further cutter blade disposed adjacent said second side face.

Figure 6A:
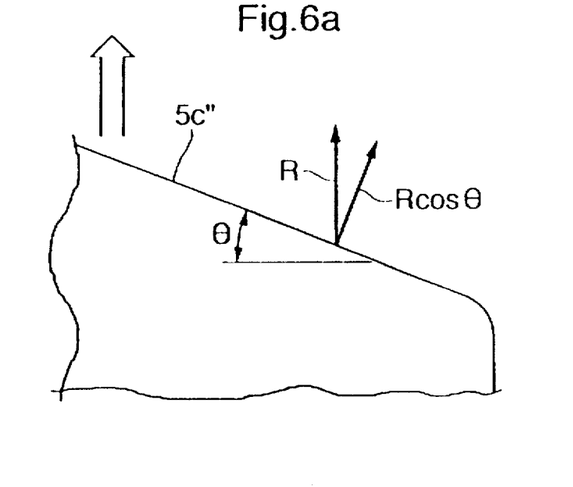
FIG. 6a-6c is a descriptive views illustrating a reaction force generated due to contact between a mower housing and grass.

With the above-described construction of the mower, in a side edge cutting operating grass located forwardly of the outer side end or top point of the revolution locus of the cutter blade disposed on the opposite side to the discharge opening of the housing comes into contact with the flat extension portion of the front panel. Then, as the rotation centers of all the cutter blades are located rearwardly of the common tangential line interconnecting the forward ends of the revolution loci of the cutter blades disposed adjacent the first side face and second side face respectively, this flat extension portion may have a gentle inclination relative to the lateral direction of the vehicle body. Now, supposing the flat extension portion has an inclination angle θ (deg) relative to the lateral direction of the vehicle body for example; then, when the mower travels forwardly, as a reaction force against this forward drive force, there is generated a vector component (R cos θ) normal to the flat extension portion. This vector component, as illustrated in FIG. 6, may be further decomposed into a vector component in the laterally outer side of the vehicle body which component is effective for felling down The grass to the laterally outwards Then, the smaller the angle θ (deg), the smaller the vector component in the laterally outerwards relative to the vehicle body. Accordingly, it is important that the flat extension portion of the second front panel have a smaller inclination. Then, as the grass located in the vicinity of the lateral end of the revolution locus of the cutter blade comes into contact with the flat extension portion having such gentle inclination of the second front panel, it becomes possible to reduce the possibility of the grass being felled down to the laterally outer side relative to the vehicle body.

As described above, through the relatively small modification of the shapes of the front panel and side panel of the cutter housing, a passenger-driven type mower having a plurality of cutter blades may be improved in its side edge cutting performance while maintaining the general grass cutting performance of the mower. Further, as this modification is a minor modification concerning only the contour of the cutter housing, the improvement may be achieved with minimum increase in the costs.

Further and other objects, features and effects of the invention will become more apparent from the following more detailed description of the embodiments of the invention with reference to the accompanying drawings.

DETAILED DESCRIPTION OF THE PREFERRED EMBODIMENTS

Preferred embodiments of the present invention will be described by taking for example a passenger-driven mid-mount type mower having a mower apparatus mounted between front and rear wheels.

Figure 1:
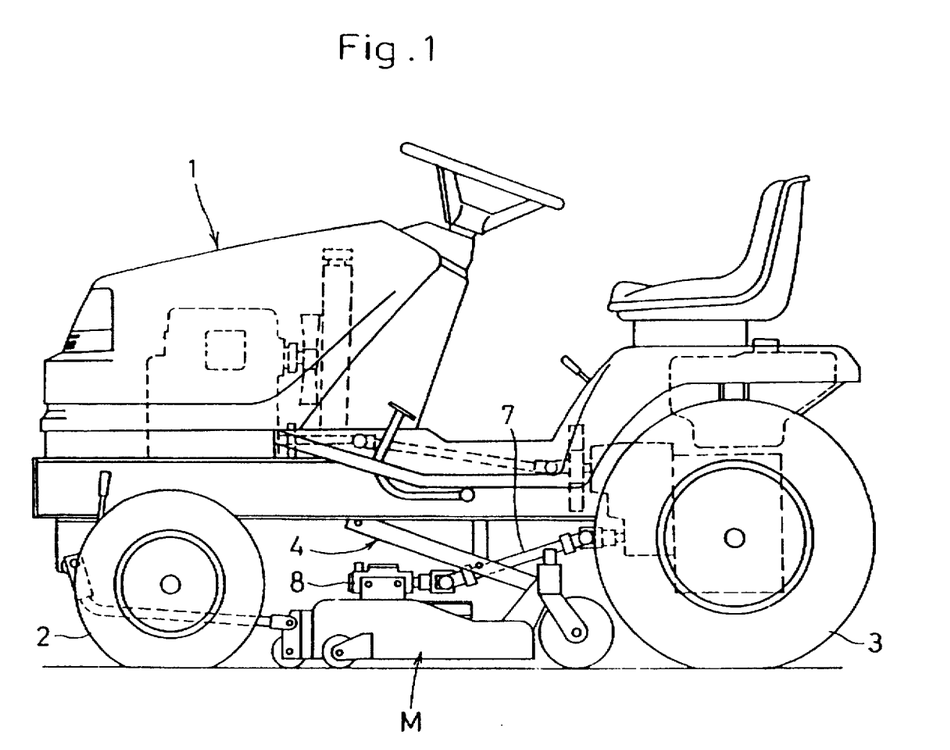
FIG. 1 is a side view showing a complete passenger-driven mower in accordance with the present invention.

FIG. 1 shows the entire passenger-drive mid-mount mower vehicle. This mower apparatus M is liftably mounted via a link mechanism 4 between front and rear wheels 2, 3 of the traveling vehicle body 1. Grass clippings cut by the mower apparatus M are discharged through a discharge opening defined at one lateral side of a cutter housing.

Figure 2:
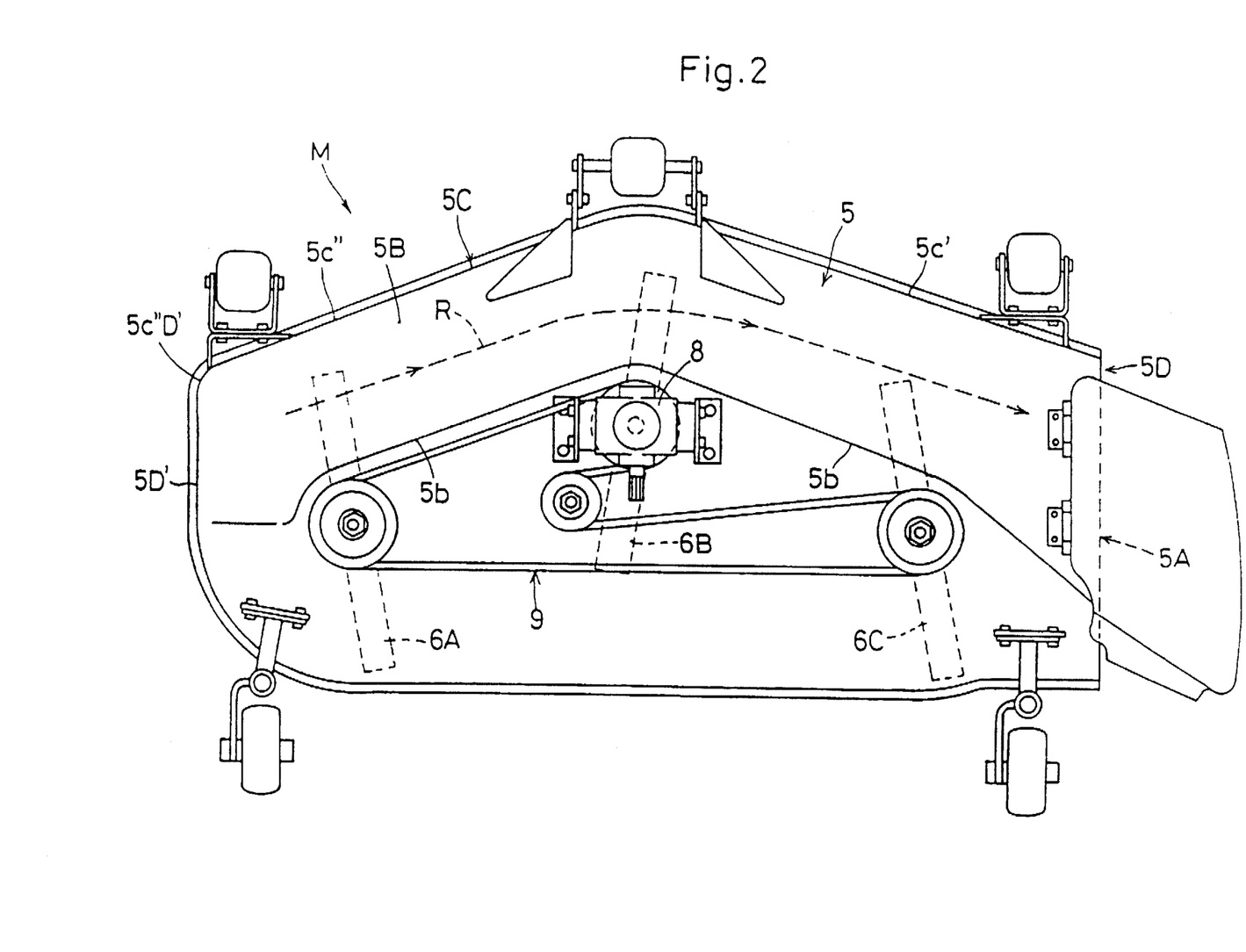
FIG. 2 is a plan view of the mower.
Figure 3:
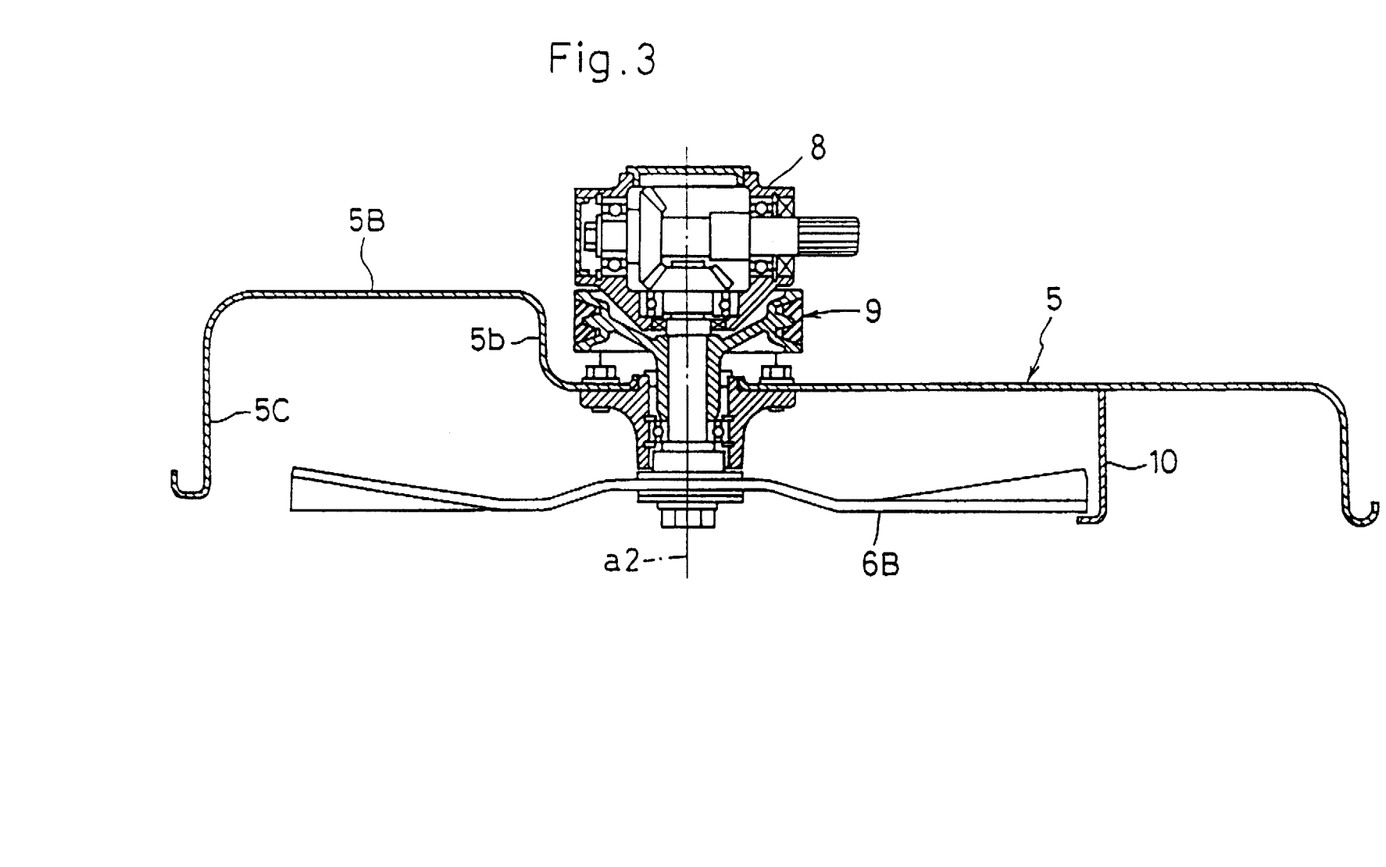
FIG. 3 is a side view in vertical section of the mower apparatus shown in FIG. 1, FIG. 4a-4c are bottom views of the mower apparatus shown in FIG. 1.

FIG. 2 is a plan view of the cutter housing 5. As shown, the mower apparatus M includes, within the cutter housing 5, three cutter blades 6A, 6B and 6C rotatable about respective vertical axes. The discharge opening 5A is defined in a first side face 5D of the cutter housing 5. Via a transmission shaft 7 extending from the vehicle body and a bevel gear mechanism disposed within a bevel gear casing 8 mounted on an upper face of the cutter housing 5, the center blade 6B is driven, which blade in turn drives, via a belt transmission 9, the right and left side cutter blades 6A, 6C.

At a front upper face of the cutter housing 5, there is formed a bulging portion 5B acting as a grass clipping discharge passage R and including an inner wall 5b extending substantially parallel with a virtual line drawn to interconnect the centers of revolution of the respective cutter blades 6A, 6B and 6C.

Figure 4A:
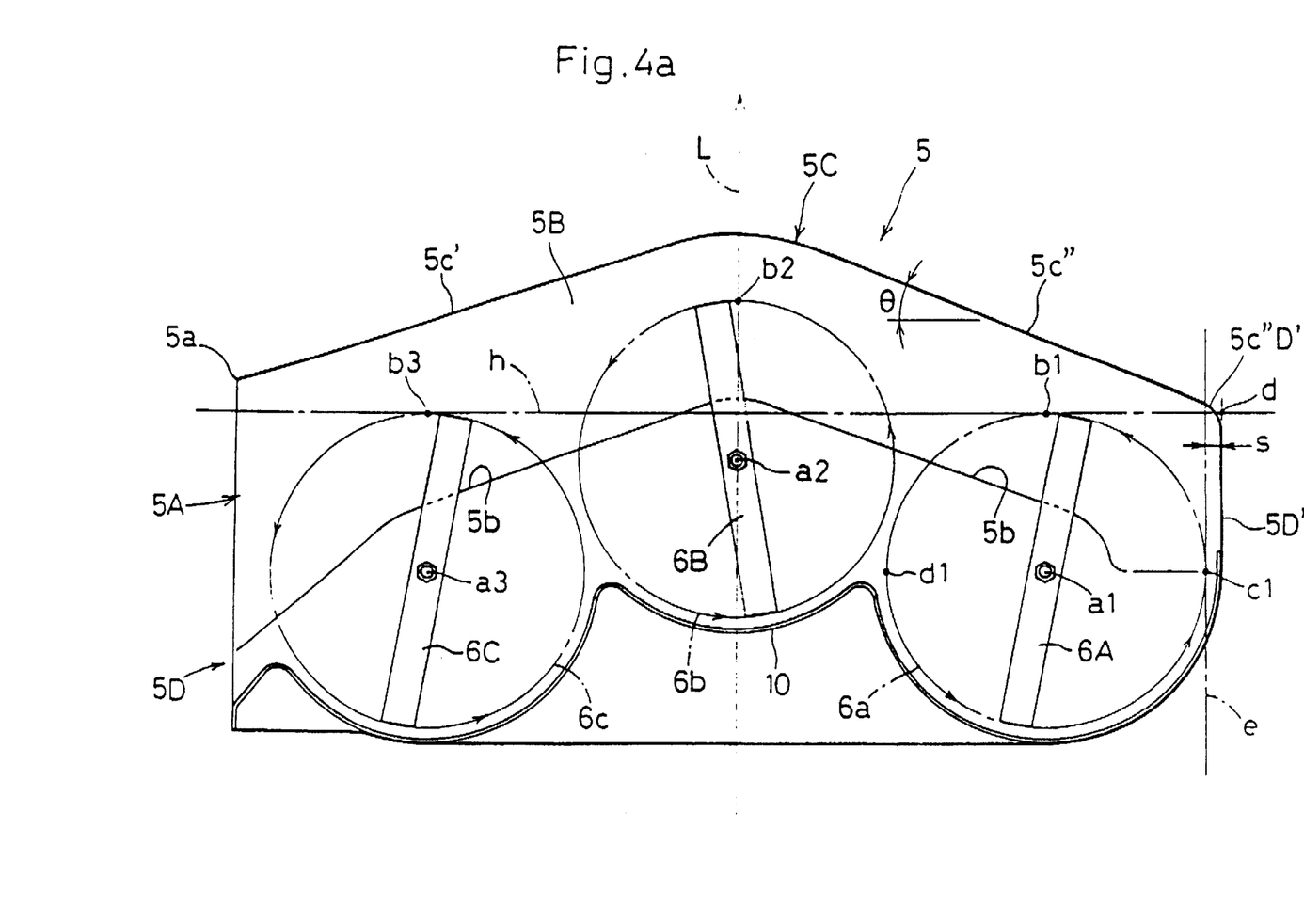

FIG. 4a is a bottom view of the cutter housing 5. As may be apparent from this figure, the lateral outer end C1 of the locus of revolution of 6a of the side cutter blade 6A disposed on the opposite side to the discharge opening defines the limit of the maximum cutting width of this housing 5. A segment e comprises a tangential line to the revolution locus 6a extending parallel with a longitudinal center line L of the vehicle body. A second front panel 5c" of the front panel 5C on the right side in the figure is formed of a flat extension portion, which portion extends substantially to the vicinity of the tangential line e.

FIG. 6 illustrates a force applied to the grass from the second front panel 5c" in the course of a normal edge cutting operation using the above-described passenger-type mower. Namely, a mark R denotes the force R along the traveling direction of the vehicle, R cos θ0 denotes a vector component thereof in the direction normal to the extending direction of the second front panel 5c" and R cos θ sin θ denotes a still further vector component in the laterally outer side relative to the vehicle body.

Figure 6B:
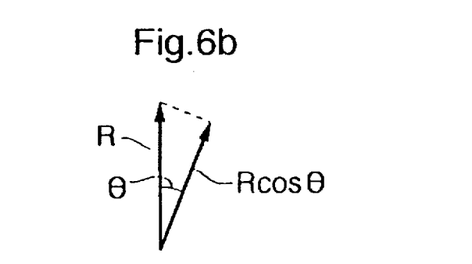
Figure 6C:
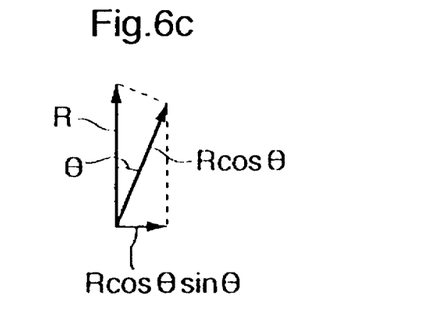

This second front panel 5c" has a gentle inclination of approximately 20 degrees relative to the lateral direction of the vehicle body, so as to restrict the lateral vector component (R cos θ0 sin θ: see FIG. 6c) of the force (R: see FIGS. 6a, b, c) applied to the grass located at a forward position on the tangential line e when the grass comes into contact with this second front panel 5c" With this, it is possible to minimize the degree of the grass felling down to the laterally outer side of the vehicle body. Incidentally, as a free space is formed between the front panel 5C and the forward ends of the loci of revolution of the three cutter blades 6A, 6B, 6C, the grass once forwardly felled down by the front panel 8C may resiliently rise up again into the free space.

Further, the longitudinal distance (relative to the vehicle body) between the terminal end of the revolution locus of the side cutter blade 6A and the front panel 5C is at its maximum when the terminal end of the blade is Located at the outer side end c1, then slightly decreases toward the vicinity of the forward top b1 of the locus and thereafter gradually increases past the forward end b1 toward the opposite or inner side end d1.

Incidentally, if the center cutter blade 6B is disposed significantly forwardly relative to the side cutter blades 6A, 6C, this will necessarily lead to significant forward projection of the center area of the front panel 5C. As a result, the second front panel 5c" of the front panel 5C necessarily has a large inclination disadvantageously. With such large inclination of the second front panel 5c" relative to the lateral direction of the vehicle body, the lateral vector component effective for felling the grass down to the laterally outer side of the vehicle body will increase. For this reason, for effective side edge cutting operation, e cutting operation, it is necessary to restrict this inclination to a predetermined angle.

Accordingly, a rotation center a2 of the center cutter blade 6B is set rearwardly of a common forward tangential line of the revolution loci 6a, 6c of the side cutter blades 6A, 6C, namely, rearwardly of a segment h interconnecting the forward ends b1, b3 of these side cutter blades 6A, 6C, so as to prevent such significant forward projection of the center area of the front panel 5C with the reduced inclination relative to the lateral direction of the vehicle body.

As shown in FIG. 4a, the second front panel 5c" and the side panel 5D' are joined to each other via a curvature face portion 5c"D'. In this regard, for extending the flat extension portion of the second front panel 5c" to the lateral tangential line e, the greater the radius of the curvature face portion 5c"D', the greater the distance s between the side panel 5D' and the lateral tangential line e, thereby to make it difficult to visually confirm the lateral cutting width limit in a side edge cutting operation. For this reason, in order to enable efficient side edge cutting operation, it is preferred that the distance s be set to be smaller than a predetermined value. In particular, it is proposed that the radius of the curvature face portion 5c"D' be significantly smaller (not more than ½) than the radius of revolution locus 6a of the side cutter blade 6A.

With the above, the grass located forwardly of the lateral end cl of the side cutter blade 6A will not be felled down to the laterally outer side, whereby a side edge cutting operation may be carried out efficiently.

Further, the second front panel portion 5c" disposed on the opposite side to the discharge opening 5A across the center cutter blade 6B is formed substantially parallel with an inner wall 5b provided for forming a grass clipping discharge passage whereas, the first front panel portion 5c' on the side of the discharge opening 5A is formed so as to gradually extend away from the inner wall 5b. As a result, on the side of the discharge opening 5A, the discharge passage R has a gradually increasing width toward the discharge opening 5A. More particularly, a front end 5a of the discharge opening 5A is disposed forwardly of the common forward tangential line h of the revolution loci 6a, 6c of the opposed side cutter blades 6A, 6C, thereby to provide the discharge passage R with the increased opening width adjacent the opening 5A.

Figure 4B:
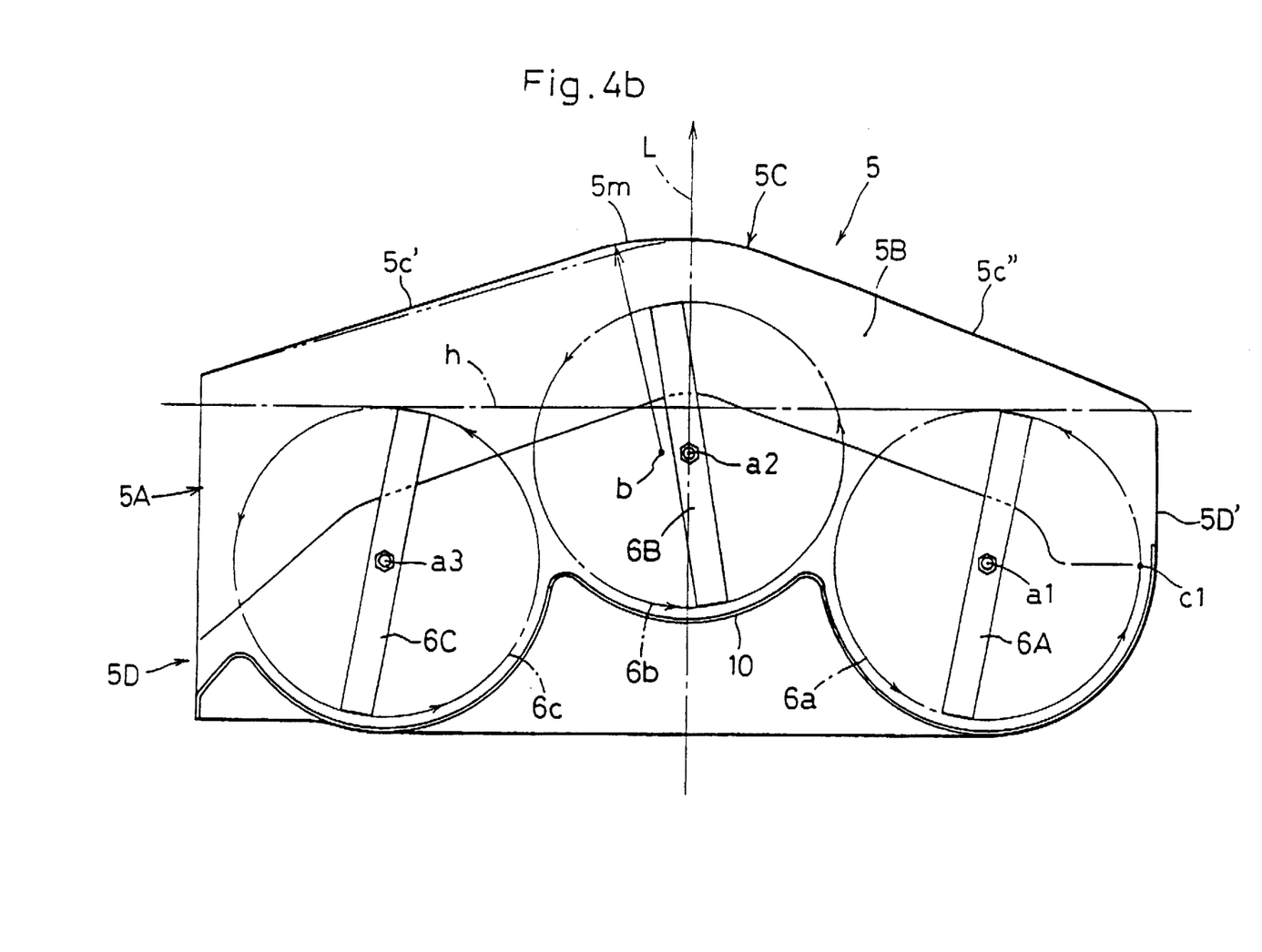

Further, as shown in FIG. 4b, of the front panel 5C of the cutter housing 5 forming the outer wall of the glass clipping discharge passage R, a front wall portion 5m opposed to the center cutter blade 6B may be formed as an arcuate wall portion extending peripherally about a center point b which is offset from the rotation center a2 of the center cutter blade 6B toward the discharge opening 5A. With these arrangements of the shape of the front panel 5C, it becomes possible to increase the cross sectional area of the grass clipping discharge passage R adjacent the discharge opening, so as to further improve the discharging performance of the mower.

Figure 4C:
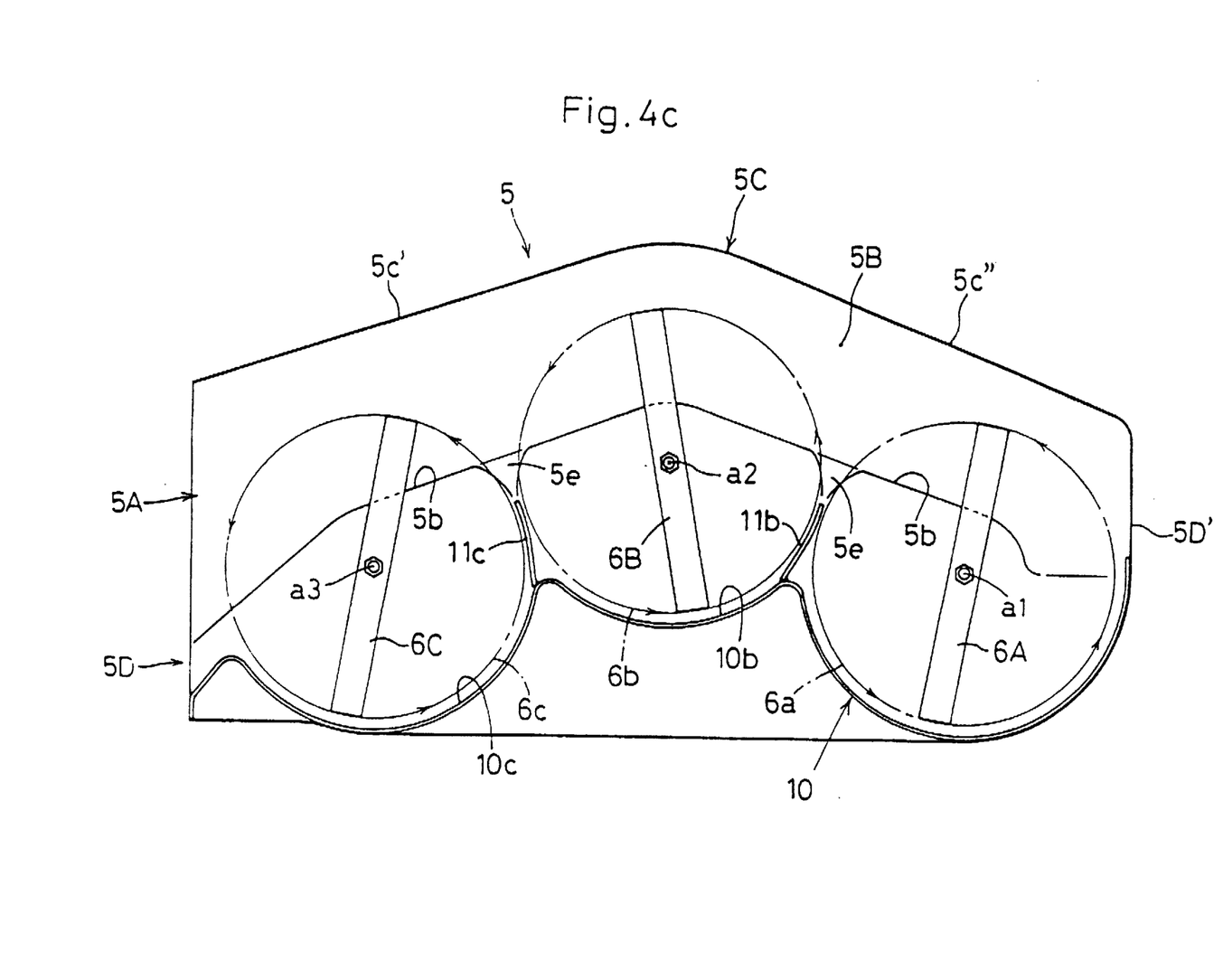

As shown in FIG. 4c, at a rear inner region of the cutter housing 5, there is disposed a vacuum plate 10 providing grass clipping guide faces 10a, 10b, 10c extending respectively along the rear arcs of the revolution loci 6a, 6b, 6c of the cutter blades 6A, 6B and 6C. Further, in order to restrict mutual contact between the grass clippings carried along by the respective rotating cutter blades 6A, 6B, 6C, this vacuum plate 10 may additionally include extension guide pieces 11b, 11c extending from the respective downstream ends of the guide faces 10b, 10c toward the forward region of the cutter housing. Incidentally, these extension guide pieces 11b, 11c may be caused to extend with curvature along the respective revolution loci 6b, 6c.

Figure 5:
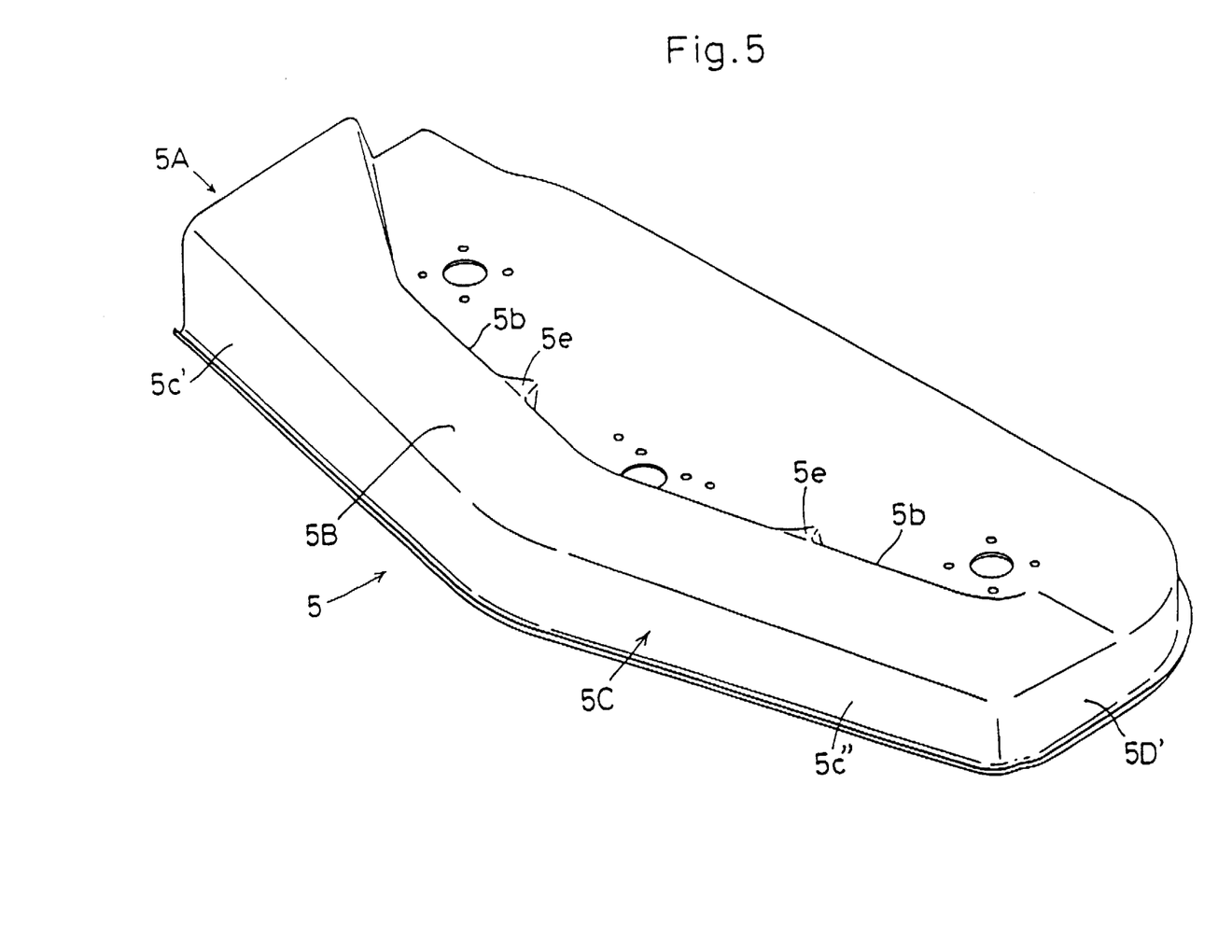
FIG. 5 is a perspective view of the mower apparatus shown in FIG. 1.

Also, with the above-described mower, most of the grass clippings are discharged to the outside through the grass clipping discharge passage R. Yet, some grass clippings may be continuously carried along by the respective cutter blades 6A, 6B without being discharged and come into contact with the inner wall 5b of the bulging portion 5B, so that such un-discharged clippings may remain stagnant within the discharge passage R. For this reason, in this mower, as shown in FIGS. 4c and 5, the portions of the inner wall 5b in the bulging portion adjacent the revolution loci of the cutter blades 6A, 6B, 6C may be provided as inclined faces 5e, 5e having rearward recesses, so as to restrict such stagnation of grass clippings inside the discharge passage.

In the foregoing embodiment, the mower includes three cutter blades. Instead, the present invention may be embodied in a mower housing accommodating two or more than four cutter blades.

Further, the foregoing embodiment concerns a midmount type mower. The invention is not limited thereto, but may be applied in a front-mount mower as well.

The invention may be embodied in other specific forms without departing from the spirit or essential characteristics thereof. The present embodiments are therefore to be considered in all respects as illustrative and not restrictive, the scope of the invention being indicated by the appended claims rather than the foregoing description and all changes which come within the meaning and range of equivalency of the claims are therefore intended to be embraced therein.

What is claimed is:

1. A mower including a plurality of cutter blades, which comprises:

a housing accommodating the cutter blades, the housing including, a first side face defining a discharge opening for discharging grass clippings, a side panel formed at a second side face disposed on the opposite side to the first side face relative to a longitudinal center line of a vehicle body, and a front panel having a first front panel portion disposed adjacent said discharge opening, and a second front panel portion including a flat extension portion extending on the opposite side to the discharge opening;

wherein said flat extension portion extends substantially to a virtual line extending from an outer side end of a locus of revolution of said blade disposed adjacent said second side face in parallel with a traveling direction of the vehicle body, with a free space being defined between said locus of revolution of said blade disposed adjacent said second side face and said flat extension portion of said second front panel portion; and wherein rotation centers of said respective cutter blades are located rearwardly of a common tangential line interconnecting forward ends of revolution loci of said cutter blade disposed adjacent said first side face and of said further cutter blade disposed adjacent said second side face.

2. A mower according to claim 1, wherein said second front panel portion and said side panel are joined to each other via a curvature face portion, said curvature face portion having a radius which is not more than ½ of a radius of the revolution locus of each said cutter blade.

3. A mower according to claim 2 wherein said second front panel portion has an inclination relative to the vehicle body such that a distance between said second front panel portion and the revolution locus of the cutter blade disposed adjacent said side panel increases past a forward end of said revolution locus and towards the opposite lateral sides of the vehicle body.

4. A mower according to claim 3, wherein said side panel includes a planar portion which appears as a straight line in a plan view and which extends forwardly relative to the vehicle body beyond said common tangential line.

5. A mower according to claim 1, wherein a front end of said discharge opening is disposed forwardly of a common tangential line of the revolution loci of opposed side cutter blades.

6. A mower according to claim 1, wherein said cutter housing includes a bulging portion forming a grass clipping discharge passage extending substantially parallel with a vertical line interconnecting the centers of adjacent cutter blades, said discharge passage extending to said discharge opening.

7. A mower according to claim 6, wherein said discharge passage has a gradually increasing width extending toward said discharge opening.

8. A mower according to claim 1, wherein said second front panel portion has an inclination relative to the lateral direction of the vehicle body ranging not more than 30 degrees.

9. A mower according to claim 1, wherein said front panel includes a curved center front wall portion opposed from a center cutting blade, said curved center front wall portion having a center of curvature offset from a rotation center of said center cutting blade in a direction of said discharge opening.

10. A mower according to claim 1, further including a vacuum plate in a rear region of said housing, said vacuum plate extending along the rear arcs of the revolution loci of said cutter blades, and extension guide plates extending forwardly from said vacuum plate between adjacent cutter blades.

11. A mower including a plurality of cutter blades, which comprises:

a housing accommodating the cutter blades, the housing including, a first side face defining a discharge opening for discharging grass clippings, a side panel formed at a second side face disposed on the opposite side to the first side face relative to a longitudinal center line of a vehicle body, and a front panel having a first front panel portion disposed adjacent said discharge opening, a second front panel portion disposed on the opposite side to the discharge opening, and a curvature face portion formed between said second front panel portion and said side panel;

wherein said side panel includes a lateral flat portion extending substantially parallel with a traveling direction of the vehicle body in a plan view, said lateral flat portion extending, in the plan view, to a virtual line extending to the vicinity of a common tangential line interconnecting respective forward ends of revolution loci of one of said cutter blades disposed adjacent said first side face and another of said cutter blades disposed adjacent said second side face;

wherein said second front panel portion has a planar portion which appears as a straight line in the plan view, said planar portion extending to the vicinity of a tangential line extending from a lateral outer end of the revolution locus of said cutter blade disposed adjacent said side panel in parallel with the longitudinal center line of the vehicle body; and wherein a free space is defined between said lateral flat portion and the revolution locus of said cutter blade disposed adjacent said side panel.

12. A mower according to claim 11, wherein said second front panel portion has an inclination relative to the lateral direction of the vehicle body of approximately 20 degrees.

* * * * *